United States Patent Office 3,325,485
Patented June 13, 1967

3,325,485
3-(HALOPHENYL-OXOALIPHATIC)BENZO-
THIADIAZINE-1,1-DIOXIDES
Frederick C. Novello, Berwyn, Pa., assignor to Merck & Co., Inc., Rahway, N.J., a corporation of New Jersey
No Drawing. Filed Nov. 25, 1960, Ser. No. 71,456
2 Claims. (Cl. 260—243)

This invention is concerned with novel sulfamyl-1,2,4-benzothiadiazine-1,1-dioxide compounds having attached to the 3-position carbon of the nucleus a halogen-substituted aliphatic radical or a halogen-substituted aromatic-aliphatic radical wherein the aliphatic residue of the aromatic-aliphatic group contains sulphur, oxygen, or a sulfonyl group as part of the aliphatic moiety. The compounds of this invention also contain at least one additional substituent attached to the benzenoid portion of the nucleus and this group or groups is selected from halogen or a halogen-like radical such as chlorine, bromine, fluorine, trifluoromethyl, trichloromethyl and the like, a lower alkyl radical preferably having from 1 to 5 carbon atoms, a lower alkoxy radical having advantageously from 1 to 5 carbon atoms, or the nitro group.

Among the 3-(halo-aliphatic)-benzothiadiazine compounds of this invention, those of particular interest are those wherein the 3-position substituent is a halogen-substituted hydrocarbon radical, preferably a halo-lower alkyl residue.

Among the 3 - (halo-substituted aromatic-aliphatic)-benzothiadiazine compounds, those of particular interest contain an aliphatic residue, preferably lower alkyl, having sulphur, oxygen, or a sulfonyl group as part of the aliphatic moiety and wherein the aromatic portion of this group is phenyl.

In all of the above compounds, the halo-substituent in the 3-position grouping is selected from chlorine, bromine, or fluorine, although the chlorine atom is preferred.

The invention also is concerned with the corresponding dihydro-benzothiadiazine compounds having attached to its 3-position carbon a halo-aliphatic or a halo-substituted aromatic-aliphatic residue of the types described above.

The novel compounds of this invention possess diuretic, natriuretic, and/or saluretic properties (hereinafter referred to as diuretic properties). These compounds therefore are useful in the treatment of abnormalities which produce an edematous condition in the body or which produce an imbalance in the electrolyte concentration in the body as, for example, those conditions in which abnormal retention of sodium occurs. The compounds find use especially in the treatment of edematous conditions, congestive heart failure, and other abnormalities produced by an excessive retention of sodium.

The new compounds can be administered in therapeutic dosages in conventional vehicles as in the form of tablets, pills, capsules, and the like as they are effective upon oral administration. They also can be administered parenterally in sterile solutions.

The 3-halo-aliphatic- and the 3-halo-aromatic-aliphatic-sulfamyl-1,2,4 - benzothiadiazine-1,1-dioxide compounds can be prepared by treating an alcoholic solution of the appropriate disulfamyl-N-haloacylaniline compound with a tertiary amine. While the reaction will proceed quite satisfactorily at room temperature, the reaction mixture can be heated, if desired.

The cyclized product obtained can be converted to its dihydro derivative by treatment of a solution of the sodium salt of the cyclized product in water with sodium borohydride at room temperature or by heating under reflux the cyclized compounds with sodium borohydride in tetrahydrofuran. Alternatively, the cyclized product can be reduced in the presence of ruthenium to the desired dihydro derivative.

While the above discussion outlines general methods suitable for the preparation of the novel compounds of this invention, it is to be understood that the methods described above as well as those described in the following examples are illustrative of those methods which can be employed and are not to be construed as limiting the invention to the particular methods or to the particular compounds specifically described.

EXAMPLE 1

3-chloromethyl-6-chloro-7-sulfamyl-1,2,4-benzothiadiazine-1,1-dioxide

Step A.—A solution of 17.1 g. (0.06 mole) of 5-chloro-2,4-disulfamylaniline and 7.5 g. (0.066 mole) of chloroacetylchloride in 225 ml. of dioxane is heated under reflux for 24 hours and then concentrated to dryness in vacuo. The residue is recrystallized from a mixture of alcohol and water to give 5 - chloro - 2,4 - disulfamyl - N-chloroacetylaniline, M.P. 240°–242° C.

Step B.—A solution of 3.3 g. of 5-chloro-2,4-disulfamyl-N-chloroacetylaniline in 250 ml. of 25% methanolic trimethylamine is allowed to stand at room temperature for two hours and then is concentrated to dryness in vacuo. The residue is recrystallized from a mixture of ethanol and water to give 3-chloromethyl-6-chloro-7-sulfamyl-1,2,4 - benzothiadiazine-1,1-dioxide, M.P. 323–326° C.

Analysis.—Calculated for $C_8H_7Cl_2N_3O_4S_2$: C, 27.91; H, 2.05; N, 12.21. Found: C, 28.45; H, 2.28; N, 12.23.

EXAMPLE 2

3-(β-chloroethyl)-6-chloro-7-sulfamyl-1,2,4-benzothiadiazine-1,1-dioxide

Step A.—A solution of 10.4 g. (0.04 mole) of 5-chloro-2,4-disulfamylaniline and 5.6 g. (0.044 mole) of β-chloropropionyl chloride in 150 ml. of dioxane is heated under reflux for 24 hours and then concentrated to dryness in vacuo. Recrystallization of the residue from a mixture of ethanol and water gives 5-chloro-2,4-disulfamly-N-(β-chloropropionyl)aniline, M.P. 233–234° C.

Step B.—By replacing the 5-chloro-2,4-disulfamyl-N-chloro-acetylaniline employed in Example 1, Step B, by an equivalent quantity of the product obtained as described above, and following substantially the same procedure described in Example 1, Step B, there is obtained 3-(β-chloroethyl)-6-chloro-7-sulfamyl-1,2,4-benzothiadiazine - 1,1-dioxide.

EXAMPLE 3

3-(β-chloroethyl)-6-chloro-2-methyl-7-(N-methylsulfamyl)-1,2,4-benzothiadiazine-1,1-dioxide Step A.—5-chloroaniline-2,4-disulfonyl chloride (6.6 g.) is added portionwise to 40% aqueous methylamine (50 ml.). After heating on the steam-bath for one hour, the mixture is cooled and the crystalline solid collected on the filter. Recrystallizaton of the sold from aqueous alcohol gives 5-cholro-2,4-di-(N-methylsulfamyl)aniline as colorless needles, M.P. 175.5–178° C.

Step B.—A solution of the thus obtained product and an equivalent molecular quantity of β-chloropropionyl chloride in dioxane is heated under reflux about 20 hours and then concentrated to dryness in vacuo giving 5-chloro-2,4-di-(N-methylsulfamyl) - N - (β-chloropropionyl) aniline.

Step C.—By replacing the 5-chloro-2,4-disulfamyl-N-chloroacetylaminiline employed in Example 1, Step B, by an equivalent quantity of the thus obtained 5-chloro-2,4-di-(N-methylsulfamyl)-N-(β-chloropropionyl)aniline, and following substantially the same procedure described in Example 1, Step B, there is obtained 3-(β-chloroethyl)-6- chloro-2-methyl-7-(N-methylsulfamyl)-1,2,4 - benzothiadiazine-1,1-dioxide.

EXAMPLE 4

*2,6-di-n-butyl-3-(β-chloroethyl)-7-(N-n-butylsulfamyl)-1,2,4-benzothiadiazine-1,1-dioxide*

*Step A.*—m-Butyl-N-propylaniline (0.5 mole) is added dropwise with stirring to 375 ml. of chlorosulfonic caid in a 3-liter, round bottomed, 3-necked flask cooled in an ice bath. Sodium chloride (350 g.) is added portionwise over a period of 1–2 hours and the mixture then heated gradually in an oil bath to 150° C. After three hours at 150–160° C., the flask is cooled thoroughly in an ice bath and the contents treated with a liter of cold water. The product is extracted with ether and the extract washed with water and dried over sodium sulfate. After removal of ether on the steam bath, the residual 5-chloroaniline-2,4-disulfonyl chloride is obtained. After recrystallization from the mixture of benzene and hexane the product melts at 130–132° C. The disulfonyl chloride then is added portionwise to n-butylamine (50 ml.) and heated for approximately one hour on the steam bath. After cooling to room temperature, the solid part is collected on the filter, washed with water and crystallized from a mixture of alcohol and water to give 5-butyl-2,4-di-(N-n-butylsulfamyl)aniline. The product thus obtained then is reacted with an equimolecular quantity of β-chloropropionyl chloride by substantially the same method described in Example 2, Step A, to give 5-butyl-2,4-di-(N-n-butylsulfamyl)-N-(β-chloropropionyl)aniline.

*Step B.*—By replacing the 5-chloro-2,4-disulfamyl-N-chloroacetylaniline employed in Example 1, Step B. by an equivalent quantity of the product obtained as described above, and following substantially the same procedure described in Example 1, Step B, there is obtained 2,6-di-n-butyl-3-(β-chloroethyl)-7-(N-n-butylsulfamyl) - 1,2,4-benzothiadiazine-1,1-dioxde.

EXAMPLE 5

*3-(β-chloroethyl)-6-methoxy-7-sulfamyl-1,2,4-benzothiadiazine-1,1-dioxide*

*Step A.*—By replacing the 5-chloro-2,4-disulfamylaniline employed in Example 2, Step A, by an equimolecular quantity of 5-methoxy-2,4-disulfamylaniline and following substantially the same procedure described n Example 2, Step A, there is obtained 5-methoxy-2,4-disulfamyl-N-(β-chloropropionyl)aniline.

*Step B.*—By replacing the 5-chloro-2,4-disulfamyl-N-chloroacetylaniline employed in Example 1, Step B, by an equivalent quantity of the thus obtained 5-methoxy-2,4-disulfamyl-N-(β-chloropropionyl)aniline, and following substantially the same procedure described in Example 1, Step B, there is obtained 3-(β-chloroethyl)-6-methoxy-7-sulfamyl-1,2,4-benzothiadiazine-1,1-dioxide.

EXAMPLE 6

*3-(β-chloroethyl)-7-chloro-6-sulfamyl-1,2,4-benzothiadiazine-1,1-dioxide*

*Step A.*—By replacing the 5-chloro-2,4-disulfamylaniline employed in Example 2, Step A, by an equimolecular quantity of 4-chloro-2,5-disulfamylaniline and following substantially the same procedure described in Example 2, Step A, there is obtained 4-chloro-2,5-disulfamyl-N-(β-chloropropionyl)aniline.

*Step B.*—By replacing the 5-chloro-2,4-disulfamyl-N-chloroacetylaniline employed in Example 1, Step B, by an equivalent quantity of the thus obtained 4-chloro-2,5-disulfamyl-N-(β-chloropropionyl)aniline, and following substantially the same procedure described in Example 1, Step B, there is obtained 3-(β-chloroethyl)-7-chloro-6-sulfamyl-1,2,4-benzothiadiazine-1,1-dioxide.

EXAMPLE 7

*3-(β-chloroethyl)-6-trifluoromethyl-7-sulfamyl-1,2,4-benzothiadiazine-1,1-dioxide*

*Step A.*— 2 - amino-4-trifluoromethylbenzenesulfonic acid (32 g., 0.132 mole) is added portionwise with stirring to 100 ml. of chlorosulfonic acid and cooled in an ice bath over a 5–10 minute period. The solution is heated in an oil bath at 150° C. for three hours and then cooled to 20° C. Thionyl chloride (40 ml.) is added and the mixture heated on the steam bath for one hour, then cooled to 0° C. and poured cautiously onto ice. The aqueous liquor is decanted and the residual solid heated on the steam bath with 500 ml. of 28% ammonium hydroxide for 2 hours. Upon cooling, the product is collected on the filter, washed with water and dried. To remove a trace amount of 2-sulfamyl-5-trifluoromethylaniline that is obtained along with the produce, the material remaining on the filter is digested with 500 ml. of boiling benzene, filtered and the benzene-soluble material recrystallized from aqueous alcohol. 2,4-disulfamyl-5-trifluoromethylaniline is thus obtained as colorless needles, M.P. 241–242° C.

*Step B.*—By replacing the 5-choloro-2,4-disulfamylaniline employed in Example 2, Step A, by an equivalent quantity of the thus obtained 2,4-disulfamyl-5-trifluoromethylaniline, and following substantially the same procedure described in Example 2, Step A, there is obtained 5-trifluoromethyl-2,4-disulfamyl - N - (β-chloropropionyl) aniline.

*Step C.*—By replacing the 5-chloro-2,4-disulfamyl-N-chloroacetylaniline employed in Example 1, Step B, by an equivalent quantity of the thus obtained 5-trifluoromethyl-2,4-disulfamyl-N-(β-chloropropionyl)aniline, and following substantially the same procedure described in Example 1, Step B, there is obtained 3-(β-chloroethyl)-6-trifluoromethyl-7-sulfamyl-1,2,4-benzothiadiazine - 1,1-dioxide.

EXAMPLE 8

*3-(p-chlorophenylmercaptomethyl)-6-chloro-7-sulfamyl-1,2,4-benzothiadiazine-1,1-dioxide*

*Step A.*—p-Chlorothiophenol (1.47 g., 0.01 mole) is dissolved in an ethanolic solution of sodium ethoxide prepared from 0.23 (0.01 mole) of sodium and 50 ml. of ethanol. A suspension of 3.6 g. (0.01 mole) of 5-chloro-2,4-disulfamyl-N-chloroacetylaniline in 50 ml. of ethanol is added and the mixture heated on the steam bath with stirring for two hours. The reaction mixture is cooled and the precipitate is collected, washed with water and recrystallized from a mixture of acetone and petroleum ether to give 5-chloro-2,4-disulfamyl-N-(p-chlorophenylmercaptoacetyl)aniline, M.P. 236–237° C.

*Analysis.*—Calculated for $C_{14}H_{13}Cl_2N_3O_5S_3$: C, 35.75; H, 2.78; N, 8.93. Found: C, 36.00; H, 2.84; N, 8.90.

*Step B.*—By replacing the 5-chloro-2,4-disulfamyl-N-chloroacetylaniline employed in Example 1, Step B, by an equivalent quantity of the thus obtained 5-chloro-2,4-disulfamyl-N-(p-chlorophenylmercaptoacetyl)aniline, and following substantially the same procedure described in Example 1, Step B, there is obtained 3-(p-chlorophenylmercaptomethyl)-6-chloro-7-sulfamyl-1,2,4 - benzothiadiazine-1,1-dioxide, M.P. 281–282° C.

*Analysis.*—Calculated for $C_{14}H_{11}Cl_2N_3O_4S_3$: C, 37.17; H, 2.45; N, 9.29. Found: C, 37.47; H, 2.58; N, 9.13.

EXAMPLE 9

*3-(p-chlorophenylmercatpomethyl) - 4-methyl-6-chloro-7-sulfamyl-1,2,4-benzothiadiazine-1,1-dioxide*

*Step A.*—By replacing the 5-chloro-2,4-disulfamylaniline employed in Example 1, Step A, by an equivalent quantity of 5-chloro-2,4-disulfamyl-N-methylaniline, and following substantially the same procedure described in Example 1, Step A, there is obtained 5-chloro-2,4-disulfamyl-N-chloroacetyl-N-methylaniline.

*Step B.*—By replacing the 5-chloro-2,4-disulfamyl-N-chloroacetylaniline employed in Example 8, Step A, by an equivalent quantity of 5-chloro-2,4-disulfamyl-N-methyl-N-chloroacetylaniline, and following substantially the same procedure described in Example 8, Step A, there is obtained 5-chloro-2,4-disulfamyl-N-methyl-N-(p-chlorophenylmercaptoacetyl)aniline.

*Step C.*—The product thus obtained can be cyclized by treatment with methanolic trimethylamine by following substantially the same procedure described in Example 1, Step B, to give 3-(p-chlorophenylmercaptomethyl)-4-methyl-6-chloro-7-sulfamyl-1,2,4 - benzothiadiazine-1,1-dioxide.

EXAMPLE 10

*3-(p-chlorophenylmercaptomethyl)-6-propoxy-7-sulfamyl-1,2,4-benzothiadiazine-1,1-dioxide*

*Step A.*—m-Propoxyaniline (0.5 mole) is added dropwise with stirring to 375 ml. of chlorosulfonic acid in a 3-liter, round bottomed, 3-necked flask cooled in an ice bath. Sodium chloride (350 g.) is added portionwise over a period of 1–2 hours and the mixture then heated gradually in an oil bath to 150° C. After three hours at 150–160° C., the flask is cooled thoroughly in an ice bath and the contents treated with a liter of cold water. The product is extracted with ether and the extract washed with water and dried over sodium sulfate. After removal of ether on the steam bath, the residual 5-propoxyaniline-2,4-disulfonyl chloride is obtained and is recrystallized from a mixture of benzene and hexane. The product thus obtained then is treated with 150 ml. of 28% ammonium hydroxide and then heated on the steam bath for one hour, cooled and the product collected on the filter, washed with water and dried to give 2,4-disulfamyl-5-propoxyaniline.

*Step B.*—By replacing the 5-chloro-2,4-disulfamyl-aniline employed in Example 1, Step A, by an equimolecular quantity of the 2,4-disulfamyl-5-propoxyaniline obtained as described above, and following substantially the same procedure described in Example 1, Step A, there is obtained 5-propoxy-2,4 - disulfamyl-N-chloroacetyl aniline.

*Step C.*—By replacing the 5-chloro-2,4-disulfamyl-N-chloroacetylaniline employed in Example 8, Step A, by an equivalent quantity of the 5-propoxy-2,4-disulfamyl-N-chloroacetylaniline obtained as described above, and following substantially the same procedure described in Example 8, Step A, there is obtained 5-propoxy-2,4-disulfamyl-N-(p-chlorophenylmercaptoacetyl)aniline.

*Step D.*—The product obtained as described above can be cyclized by treatment with 25% methanolic trimethylamine by substantially the same method described in Example 1, Step B, to give 3-(p-chlorophenylmercaptomethyl)-6-propoxy-7-sulfamyl - 1,2,4-benzothiadiazine-1,1-dioxide.

EXAMPLE 11

*3-(p-chlorophenylmercaptomethyl)-6-nitro-7-sulfamyl-1,2,4-benzothiadiazine-1,1-dioxide*

*Step A.*—By replacing the 5-chloro-2,4-disulfamyl-aniline employed in Example 1, Step A, by an equivalent quantity of 5-nitro-2,4-disulfamylaniline, and following substantially the same procedure described in Example 1, Step A, there is obtained 5-nitro-2,4-disulfamyl-N-chloroacetylaniline.

*Step B.*—By replacing the 5-chloro-2,4-disulfamyl-N-chloroacetylaniline employed in Example 8, Step A, by an equivalent quantity of 5-nitro-2,4-disulfamyl-N-chloroacetylaniline, and following substantially the same procedure described in Example 8, Step A, there is obtained 5-nitro-2,4-disulfamyl - N - (p-chlorophenylmercaptoacetyl)aniline.

*Step C.*—The product obtained as described above then can be cyclized by treatment with a 25% methanolic trimethylamine solution by substantially the same method described in Example 1, Step B, to yield 3-(p-chlorophenylmercaptomethyl) - 6 - nitro-7-sulfamyl-1,2,4-benzothiadiazine-1,1-dioxide.

EXAMPLE 12

*3-(p-chlorophenylmercaptomethyl)-6-bromo-7-sulfamyl-1,2,4-benzothiadiazine-1,1-dioxide*

*Step A.*—By replacing the 5-chloro-2,4-disulfamyl-aniline employed in Example 1, Step A, by an equimolecular quantity of 5-bromo-2,4-disulfamylaniline, and following substantially the same procedure described in Example 1, Step A, there is obtained 5-bromo-2,4-disulfamyl-N-chloroacetylaniline.

*Step B.*—By replacing the 5-chloro-2,4-disulfamyl-N-chloroacetylaniline employed in Example 8, Step A, by an equimolecular quantity of 5-bromo-2,4-disulfamyl-N-chloroacetylaniline and following substantially the same procedure described in Example 8, Step A, there is obtained 5 - bromo-2,4-disulfamyl-N-(p-chlorophenylmercaptoacetyl)aniline.

*Step C.*—The product obtained as described above can be cyclized by treatment with a 25% methanolic trimethylamine solution by substantially the same method described in Example 1, Step B, to give 3-(p-chlorophenylmercaptomethyl)-6-bromo-7-sulfamyl - 1,2,4 - benzothiadiazine-1,1-dioxide.

EXAMPLE 13

*3-bromomethyl-5,6-dichloro-7-sulfamyl-1,2,4-benzothiadiazine-1,1-dioxide*

*Step A.*—5-chloro-2,4-disulfamylaniline (25.7 g., 0.09 mole) is suspended in a mixture of water (100 ml.), acetic acid (200 ml.) and concentrated hydrochloric acid (150 ml.) and heated on the steam bath with stirring until complete solution is obtained. The solution is cooled to 75° C. and 30% hydrogen peroxide (9 ml.) is added. The mixture is allowed to come to room temperature with stirring, then cooled in an ice bath and the precipitate collected on the filter, washed with water and dried to give 16 g. of 5,6-dichloro-2,4-disulfamylaniline. After recrystallization from a 6% mixture of alcohol and water, there is obtained colorless needles melting at 288–289° C.

*Step B.*—A solution of 5,6-dichloro-2,4-disulfamyl-aniline (0.06 mole) and bromoacetyl bromide (0.066 mole) in 225 ml. of dioxane is heated under reflux for about 24 hours and then concentrated to dryness in vacuo to give 5,6-dichloro-2,4-disulfamyl-N-bromoacetylaniline.

*Step C.*—The product obtained as described above then can be cyclized by treatment with a 25% methanolic trimethylamine solution by substantially the same method described in Example 1, Step B, to give 3-bromomethyl-5,6-dichloro-7-sulfamyl - 1,2,4 - benzothiadiazine-1,1-dioxide.

EXAMPLE 14

*3-(p-chlorophenoxymethyl)-6-chloro-7-sulfamyl-1,2,4-benzothiadiazine-1,1-dioxide*

*Step A.*—A mixture of 5.7 g. (0.02 mole) of 5-chloro-2,4-disulfamylaniline and 4.1 g. (0.02 mole) of p-chlorophenoxyacetyl chloride in 75 ml. of dioxane is heated under reflux for 24 hours and cooled. The product is collected on the filter and recrystallized from a mixture of ethanol and water to give 5-chloro-2,4-disulfamyl-N-(p-chlorophenoxyacetyl)aniline, M.P. 297–298° C.

*Analysis.*—Calculated for $C_{14}H_{13}Cl_2N_3O_6S_2$: C, 37.01; H, 2.88; N, 9.25. Found: C, 37.36; H, 2.85; N, 9.20.

*Step B.*—The product thus obtained then can be cyclized by treatment with a 25% methanolic trimethylamine by substantially the same method described in Example 1 Step B, to give 3-(p-chlorophenoxymethyl)-6-chloro-7-sulfamyl-1,2,4-benzothiadiazine-1,1-dioxide.

EXAMPLE 15

*3-(o-chlorophenoxymethyl)-6-chloro-7-sulfamyl-1,2,4-benzothiadiazine-1,1-dioxide.*

Step A.—By replacing the p-chlorophenoxyacetyl chloride employed in Example 14, Step A, by an equivalent quantity of o-chlorophenoxyacetyl chloride and following substantially the same procedure described in Example 14, Step A, there is obtained 5-chloro-2,4-disulfamyl-N-(o-chlorophenoxyacetyl)aniline, M.P. 285–286° C.

Analysis.—Calculated for $C_{14}H_{13}Cl_2N_3O_6S_2$: C, 37.01; H, 2.88; N, 9.25. Found: C, 37.22; H, 3.12; N, 9.38.

Step B.—The product thus obtained as described above can be cyclized by treatment with a 25% methanolic trimethylamine solution by substantially the same method described in Example 1, Step B, to give 3-(o-chlorophenoxymethyl)-6-chloro-7-sulfamyl-1,2,4-benzothiadiazine-1,1-dioxide.

EXAMPLE 16

*3-(p-chlorobenzylmercaptomethyl)-6-chloro-7-sulfamyl-1,2,4-benzothiadiazine-1,1-dioxide*

Step A.—A mixture of 5.15 g. (0.018 mole) of 5-chloro-2,4-disulfamylaniline and 4.25 g. (0.018 mole) of p-chlorobenzylmercaptoacetyl chloride in 75 ml. of dioxane is heated under reflux for 19 hours and then concentrated to dryness in vacuo. The residue is collected on the filter and recrystallized from a mixture of acetone and petroleum ether to give 5-chloro-2,4-disulfamyl-N-(n-chlorobenzylmercaptoacetyl)aniline, M.P. 225–226° C.

Analysis.—Calculated for $C_{15}H_{15}Cl_2N_3O_5S_3$: C, 37.19; H, 3.12; N, 8.68. Found: C, 37.61; H, 3.61; N, 8.65.

Step B.—The product obtained as described above can be cyclized by substantially the same method described in Example 1, Step B, by treatment with a 25% methanolic trimethylamine solution to give 3-(p-chlorobenzylmercaptomethyl)-6-chloro-7-sulfamyl-1,2,4-benzothiadiazine-1,1-dioxide.

EXAMPLE 17

*3-(p-chlorobenzylsulfonylmethyl)-6-chloro-7-sulfamyl-1,2,4-benzothiadiazine-1,1-dioxide*

Step A.—By replacing the p-chlorobenzylmercaptoacetyl chloride employed in Example 16, Step A, by an equivalent quantity of p-chlorobenzylsulfonylacetyl chloride, and following substantially the same procedure described in Example 16, Step A, there is obtained 5-chloro-2,4-disulfamyl-N-(p-chlorobenzylsulfonylacetyl)aniline, M.P. 275–276° C.

Analysis.—Calculated for $C_{15}H_{15}Cl_2N_3O_7S_3$: C, 34.89; H, 2.93; N, 8.14. Found: C, 35.33; H, 3.00; N, 8.09.

Step B.—The product obtained as described above then can be cyclized by treatment with a 25% methanolic trimethylamine solution by substantially the same method described in Example 1, Step B, to give 3-(p-chlorobenzylsulfonylmethyl)-6-chloro-7-sulfamyl-1,2,4-benzothiadiazine-1,1-dioxide.

The compounds of this invention are effective diuretic and/or saluretic agents. Because of this property, they are useful in therapy for the treatment of any condition resulting from an excessively high concentration of sodium in the body such as in the treatment of edematous conditions resulting, for example, from congestive heart failure.

The dosage of the novel compounds of this invention will vary over a wide range and for this reason tablets, pills, capsules and the like containing 100, 150, 250, or 500 mg. of active ingredients can be made available to the physician for the symptomatic adjustment of the dosage to the individual patient. These dosages are well below the toxic or lethal dose of the compounds covered by this invention.

As each of the compounds of this invention can be incorporated in a dosage form similar to that described in the following example or in other dosage forms suitable for oral or parenteral administration which can be prepared by well-known methods, only one example is included herein to illustrate the preparation of a representative dosage form.

EXAMPLE 18

*Dry-filled capsules containing 150 mg. of active ingredient per capsule*

| | Per capsule mg. |
|---|---|
| 3-($\beta$-chloroethyl)-6-chloro-7-sulfamyl-1,2,4-benzothiadiazine-1,1-dioxide | 150 |
| Lactose | 125 |

Capsule size No. 2.

The 3-($\beta$-chloroethyl)-6-chloro-7-sulfamyl-1,2,4-benzothiadiazine-1,1-dioxide is reduced to a No. 60 powder. Lactose then is passed through a No. 60 bolting cloth onto the powder. The combined ingredients are admixed for 10 minutes and then filled into No. 2 dry gelatin capsules.

While the above examples describe the preparation of certain compounds which are illustrative of the novel compounds of this invention, and a certain specific dosage form suitable for administering the novel compounds, it is to be understood that the invention is not to be limited to the specific compounds described in the examples or by the specific reaction conditions described for the preparation of the compound or by the specific ingredients included in the pharmaceutical preparation, but it is to be understood to embrace variations and modifications thereof which fall within the scope of the appended claims.

What is claimed is:

1. Sulfamyl-1,2,4-benzothiadiazine-1,1-dioxide having attached to the 3-position carbon atom halo-phenyl-lower aliphatic having oxygen as the only hetero atom as part of the aliphatic moiety, the halo in the aforementioned substituents being selected from the group selected from chlorine, bromine and fluorine; and wherein an additional substituent selected from the group consisting of halogen, lower-alkyl, lower-alkoxy, and nitro is attached to the benzenoid portion of the benzothiadiazine nucleus.

2. A benzothiadiazine having the formula

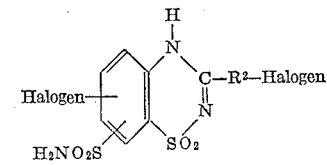

wherein $R^2$ is phenyl-lower aliphatic having oxygen as part of the aliphatic moiety and halogen in the —$R^2$ halogen group is selected from chlorine, bromine and fluorine.

References Cited

UNITED STATES PATENTS

2,809,194  10/1957  Novello _____ 260—239.1

FOREIGN PATENTS

56,478  7/1960  Australia.
575,758  8/1959  Belgium.
36,956  5/1959  Luxembourg.

OTHER REFERENCES

Lowy et al.: An Introduction to Organic Chemistry, page 213 (1945), 6th edition.

Yale: The Journal of Medicinal and Pharmaceutical Chemistry, vol. I, No. 2, pages 122–131 (1959).

NICHOLAS S. RIZZO, *Primary Examiner.*

IRVING MARCUS, *Examiner.*